INVENTORS
Barry G. Andrews
Allen C. Harriman

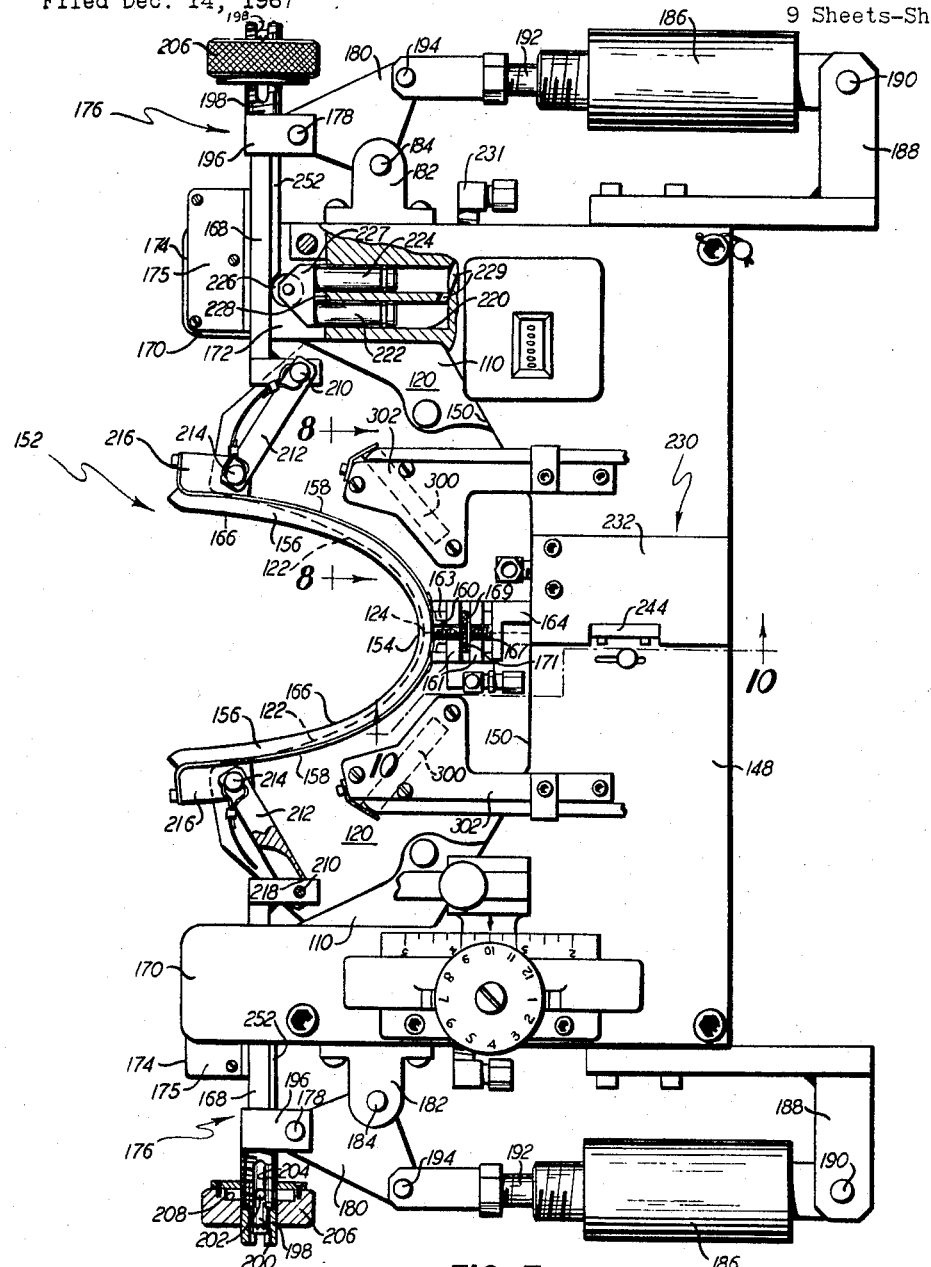
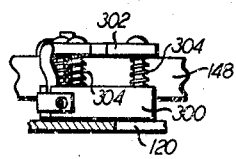
FIG.-7
FIG.-8

3,477,078
Patented Nov. 11, 1969

3,477,078
END CLAMP FOR A SHOE ASSEMBLY
Barry G. Andrews, Waltham, and Allen C. Harriman, Brockton, Mass., assignors to Jacob S. Kamborian, West Newton, Mass.
Filed Dec. 14, 1967, Ser. No. 690,527
Int. Cl. A43d 21/00
U.S. Cl. 12—14.4                                28 Claims

ABSTRACT OF THE DISCLOSURE

The instant disclosure is concerned with a shoe machine that includes mechanism for supporting a shoe assembly including a last having an insole located at the bottom thereof and a shoe upper draped thereabout. Means are provided for raising the shoe assembly into engagement with a substantially U-shaped yoke that is adapted to perform an upwiping operation on the shoe assembly. When manufacturing shoes of the moccasin type having a ridge or seam line formed at the periphery of the vamp of the upper, means are provided to selectively maintain the yoke in an out-of-the-way position so as to preclude its engagement with the shoe assembly during the rise thereof and mechanism is provided for this purpose. Mechanism is also provided for causing the yoke to clamp the upper to the last after the upwiping operation is effected.

Summary of the invention

The instant invention is directed to an improved mechanism over that disclosed in pending U.S. application Ser. No. 581,218 filed Sept. 22, 1966. The effect of this improved mechanism is to provide a more effective and uniform yieldable pressure of the yoke against the shoe assembly during the upwiping and to further provide a more efficient mechanism for effecting a tight clamping of the upper to the end of the last after the upwiping operation has been performed.

The invention will now be described in detail with reference to the accompanying drawings wherein:

Figures 7A, 13:
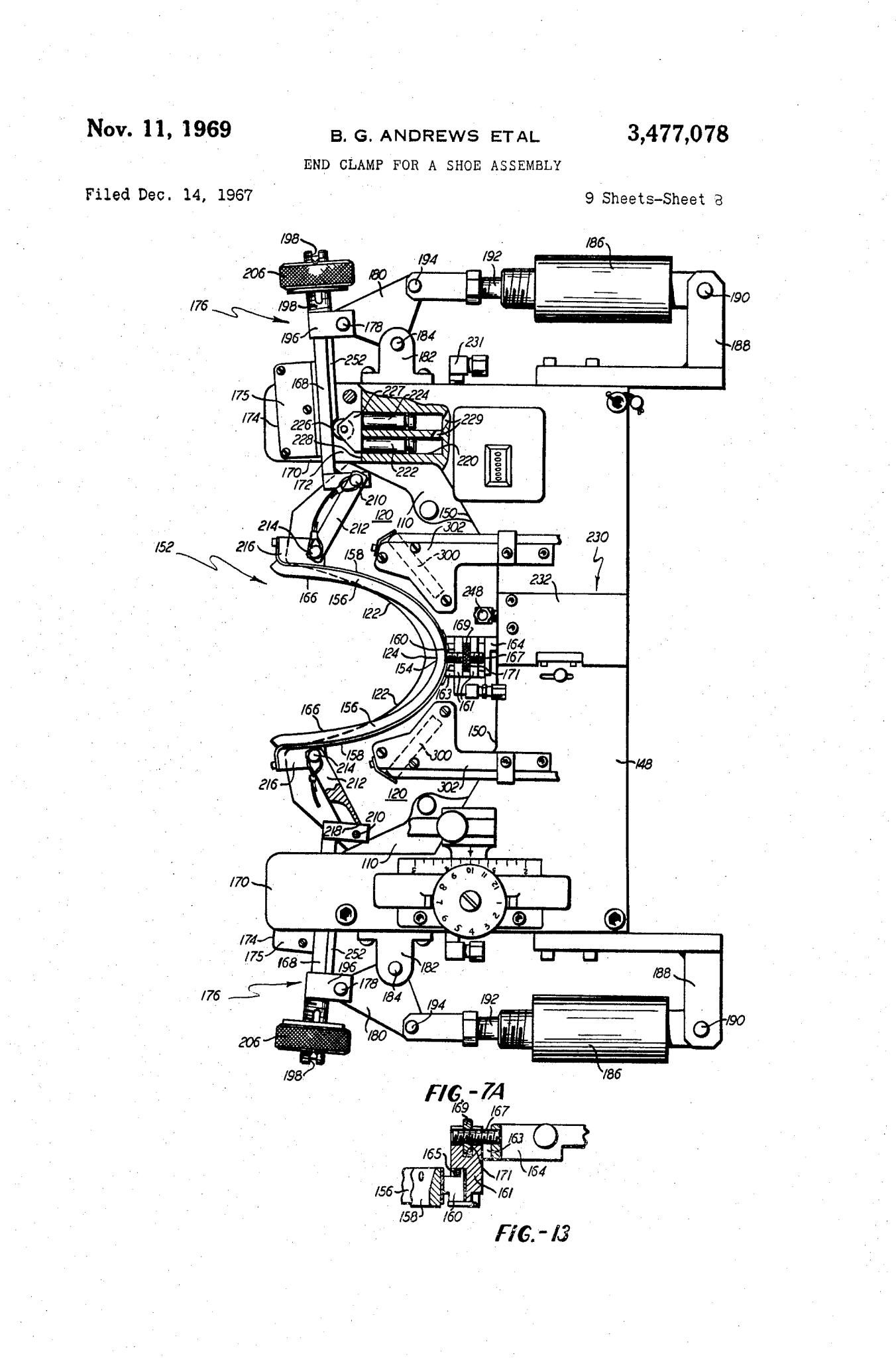

FIGURE 7 is a plan view of the yoke and cover plate partially broken away to illustrate the linkage and mechanism for operating the yoke and the relative positions thereof when the yoke is in its forward working positions;

FIGURE 7A is an illustration of the yoke similar to that of FIGURE 7 illustrating the yoke and its associated mechanisms when the yoke is in its rearward, out-of-the-way position;

FIGURE 8 is a view taken on the line 8—8 of FIGURE 7;

FIGURE 13 is a sectional view of the means for adjusting the forward and rearward position of the yoke taken along the line 13—13 of FIGURE 9;

Figure 1:
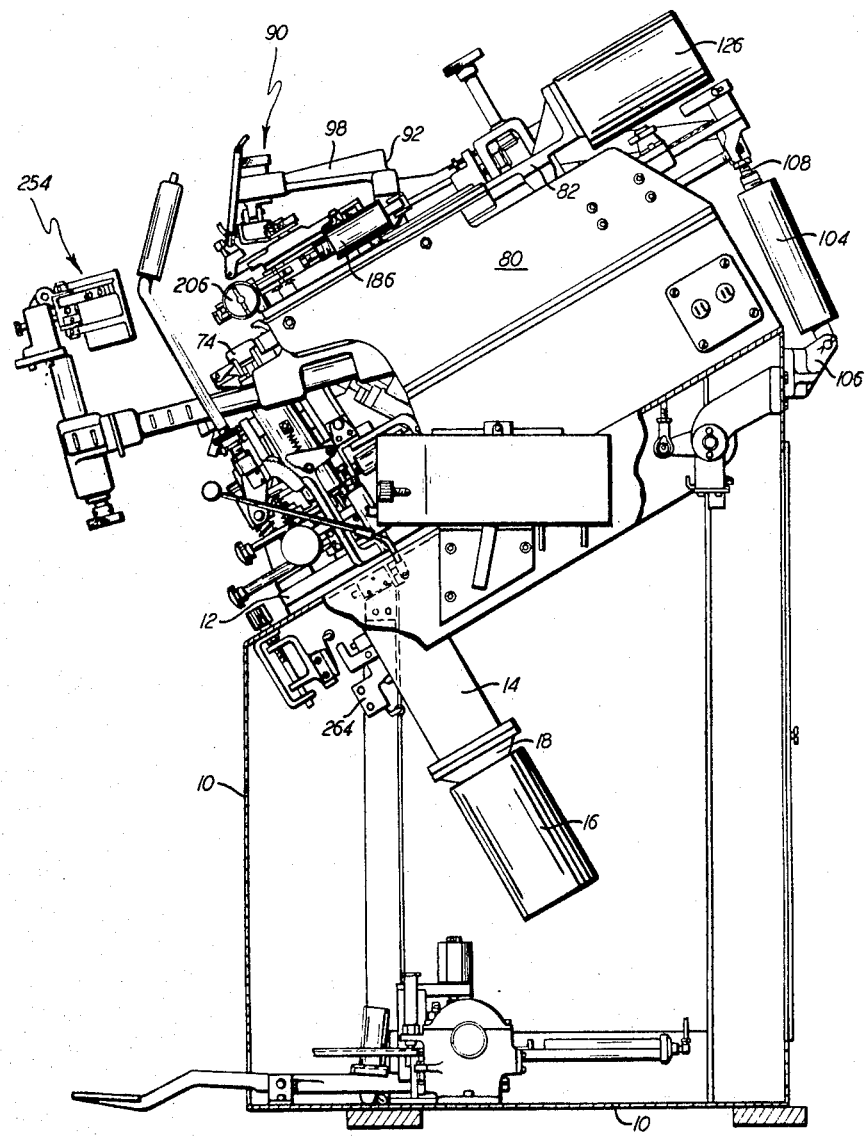
FIGURE 1 is a side elevation of the machine in which the subject of the instant invention is incorporated.

Referring to FIGURE 1 the machine has a frame 10 having a base plate 12 incorporated therein and a sleeve 14 extending downwardly from the base plate 12. For convenience of operation the base plate 12 is inclined about 30 degrees from the horizontal. For ease of explanation directions that parallel the plane of the base plate 12 will hereinafter be referred to as extending horizontally and directions paralleling that of the sleeve 14 will hereinafter be referred to as extending vertically. The operator is intended to be located to the left of the machine as seen in FIGURE 1 and a direction extending towards the operator (right to left in FIGURE 1) will be referred to as forward while a direction extending away from the operator (left to right in FIGURE 1) will be referred to as rearward.

Figures 2, 3:
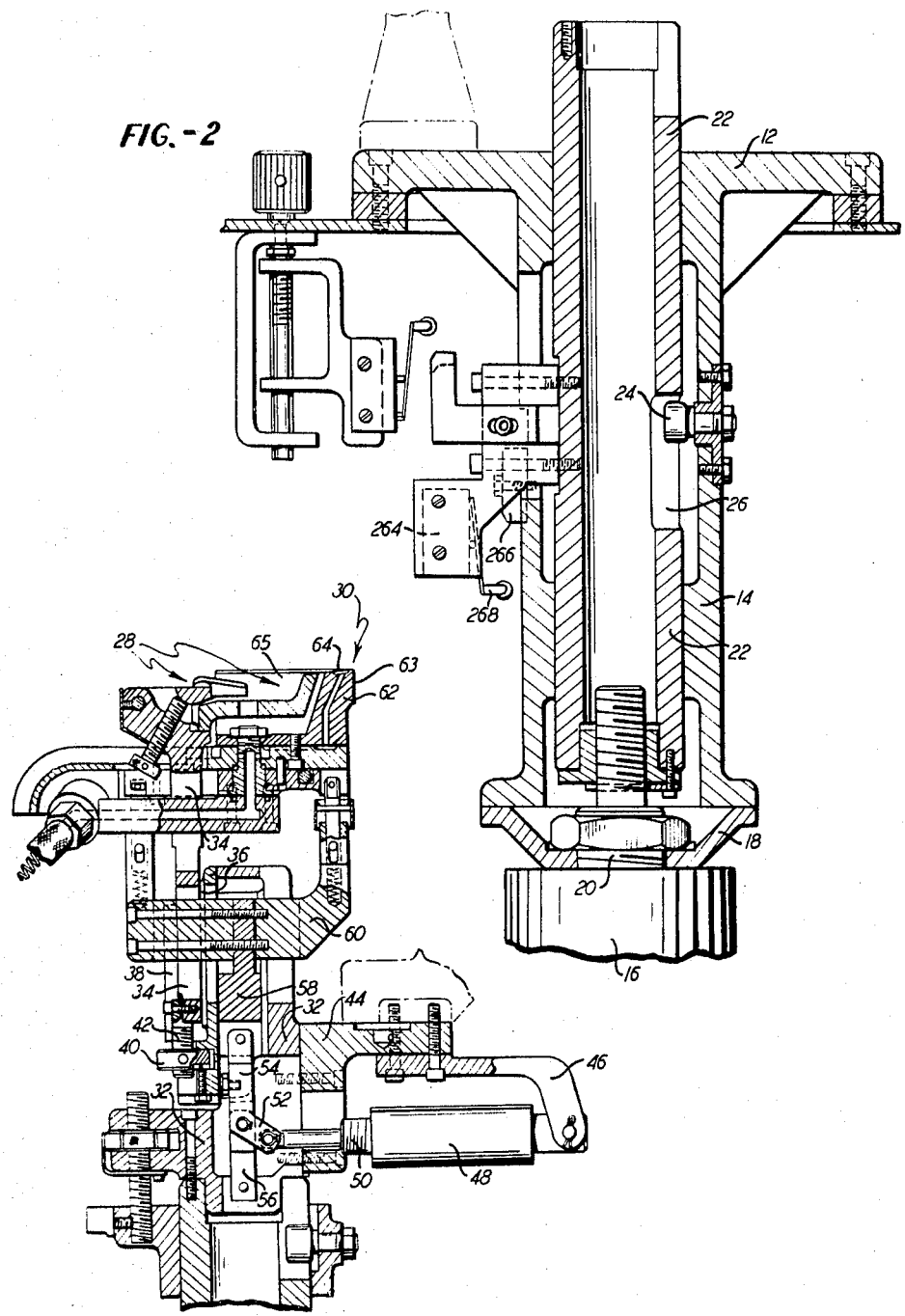
FIGURE 2 is a vertical section of the sleeve and toe post movable therein on which the shoe assembly is ultimately supported.
FIGURE 3 is a side elevation in section of the shoe assembly supporting members and the adhesive applicator that are mounted to the upper end of the toe post and directly support the shoe assembly.

An air operated motor 16 is secured to a cap 18 at the bottom of the sleeve 14 and has a piston rod 20 extending upwardly within the sleeve 14 (see FIGURE 2). A toe post 22 is contained within the sleeve 14 for vertical sliding movement therein and is connected to the piston rod 20 of the motor 16. A roller 24, mounted to the sleeve 14 and extending inwardly thereof, is received in a vertical slot 26 formed in the post 22 to preclude rotation of the post about the axis of the sleeve 14. The upper end of the toe post 22 extends upwardly beyond the level of the base plate 12. A number of shoe operating instrumentalities, hereinafter described, are supported by the upwardly extending end of the toe post 22 for heightwise movement therewith in response to actuation of the motor 16.

Figure 4:
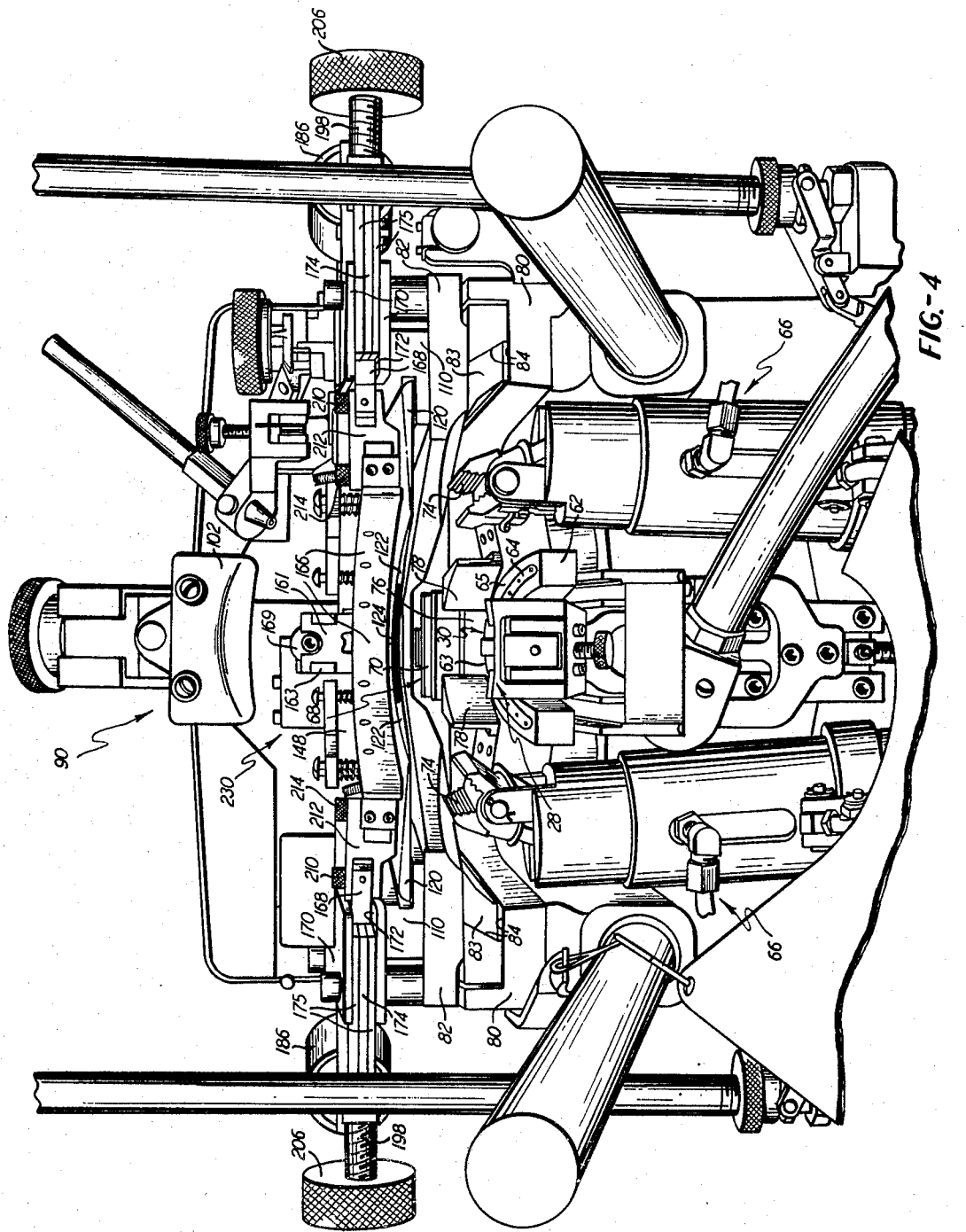
FIGURE 4 is a front elevation of the upper portion of the machine with the heel clamp removed.

Referring to FIGURES 3 and 4 it may be seen that among the shoe operating instrumentalities that are supported on the toe post 22 are an insole rest assembly 28 and an adhesive applicator assembly 30. The particular construction of these shoe manufacturing instrumentalities will be described only to the extent necessary to define the operating environment of the subject of the instant invention, reference being made to the aforesaid U.S. patent application for a more detailed disclosure thereof. The insole rest assembly 28 and adhesive applicator assembly 30 are mounted to the toe post 22 by means of a toe post extension 32 that is secured to the upwardly extending end of the toe post. The insole rest assembly 28, on which the bottom forepart of the shoe assembly rests (see FIGURES 15 and 16) is mounted on a bar 34 which in turn is slidably mounted for vertical movement between a bearing plate 36 and the gibs 38 that are secured to the toe post extension 32. A nut 40, rotatably mounted to the toe post extension 32, is in threaded engagement with a screw 42 that is fastened to the bar 34 so that rotation of the nut 40 may effect vertical adjustment of the bar 34 and insole rest assembly 28 mounted thereon and consequently the elevation of the shoe assembly with respect to the post 22.

The adhesive applicator assembly 30 is mounted to the toe post extension 32 so as to have movement that is both unitary with and independent of the toe post 22. As illustrated in FIGURE 3 a rearwardly extending ledge 44 of the toe post extension 32 has a hanger 46 depending therefrom and an air operated motor 48 is pivoted to the hanger 46. The piston rod 50 of the motor 48 is pivoted to a link 52 and the link 52 is pivoted to a pair of toggle links 54 and 56, the toggle link 56 extending downwardly of the link 52 and being pivoted to the toe post extension 32 with the link 54 extending upwardly of the link 52 and being pivoted to a slide 58 that is guided for vertical sliding movement between the toe post extension 22 and the bearing plate 36. An adhesive applicator mount 60 is secured to the slide 58 and extends upwardly therefrom. The adhesive applicator assembly 30 is mounted atop the adhesive applicator mount 60 for yieldable and tilting universal movement with respect thereto. The adhesive applicator assembly 30 includes an adhesive applicating member 62 of substantially U-shaped configuration having a dispensing trough 64 located at its upper surface that is adapted to engage the bottom of the insole and distribute a ribbon of adhesive to the marginal portion of the toe end of the bottom of the insole I. The adhesive applicator 62 has a bight 63 and a pair of legs 65 diverging forwardly from the bight 63 and embraces the insole rest assembly 28 as shown in FIGURE 4. Means fully disclosed in U.S. application Ser. No. 472,525 filed July 16, 1965 are provided for communicating adhesive from a source thereof to the trough 64 of the adhesive applicator 62. It may thus be seen that the insole rest assembly 28 and the adhesive applicator 62 may have movement that is both unitary with and independent of the toe post 22 and of each other.

Referring to FIGURE 4 it may be seen that also supported on the toe post 22 for movement in unison therewith are a pair of side pincer assemblies 66 and a toe pincer assembly 68. The toe pincer assembly 68 is mounted to the ledge 44 and extends upwardly such that the jaws 70 thereof may be disposed adjacent and rearwardly of the bight 63 of the adhesive applicator member 62. The side pincer assemblies 66 are supported about the toe post 22 for vertical movement with respect thereto. The side pincer assemblies 66 are supported in such a manner as to extend upwardly so that the jaws 74 thereof are disposed outwardly of each leg 65 of the adhesive applicator member 62. Provision is made to enable vertical adjustment of the side pincer assemblies 66 so as to raise or lower the jaws 74 thereof to a level such that when the shoe assembly is placed on the insole rest assembly 28 the downwardly extending margin M of the upper may extend into the open jaws 70, 74 in readiness to be gripped thereby (see FIGURE 14).

Figure 15:
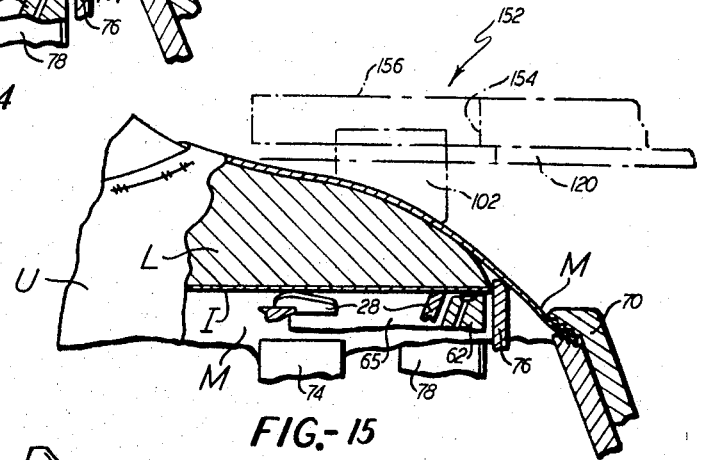
FIGURE 15 is a representation of the shoe assembly after the upper has been pulled over about the last with the yoke assembly disposed forwardly above the shoe assembly in readiness for performance of the upwiping operation.

Both the toe pincer assembly 68 and the side pincer assemblies 68 are so constructed that the jaws 70 and 74 thereof may be closed to grip the marginal portion M of the shoe upper U and subsequently move downwardly to stretch the shoe upper U about the last L. As the pincer assemblies 66 and 68 move downwardly to stretch the upper about the last L, downward movement of the last L and insole I is precluded by means of the rigid insole rest assembly upon which the last and insole bear as shown in FIGURE 15.

As more fully disclosed in U.S. applications Ser. No. 340,411 and Ser. No. 472,525 filed respectively on Jan. 27, 1964 and July 16, 1965 a front retarder 76 is interposed between the bight 63 of the adhesive applicator member 62 and the toe pincer jaws 70 and a pair of side retarders 78 are located outwardly of the legs 65 of the applicator member 62. Each of the retarders 76 and 78 is yieldably urged upwardly so as to extend above the level of the applicator member 62. The retarders 76 and 78 serve a multitude of purposes among which are to aid in properly locating the shoe assembly on the insole rest assembly 28 and to thereafter aid in the stretching of the upper U as well as to aid in temporarily maintaining the upper in a pulled over condition when the toe and side pincers 66 and 68 are caused to release their grip on the upper U as will be described herein, reference again being made to the aforesaid U.S. applications for a complete description of the construction and operation thereof.

Referring to FIGURES 1 and 4, it may be seen that the frame 10 includes a head 80 located rearwardly of the aforementioned devices. A slide plate 82 is slidably mounted in the head for forward and rearward horizontal sliding movement by means of depending slides on the slide plate mounted for sliding movement in guideways 84 formed in the head 80.

Figure 5:
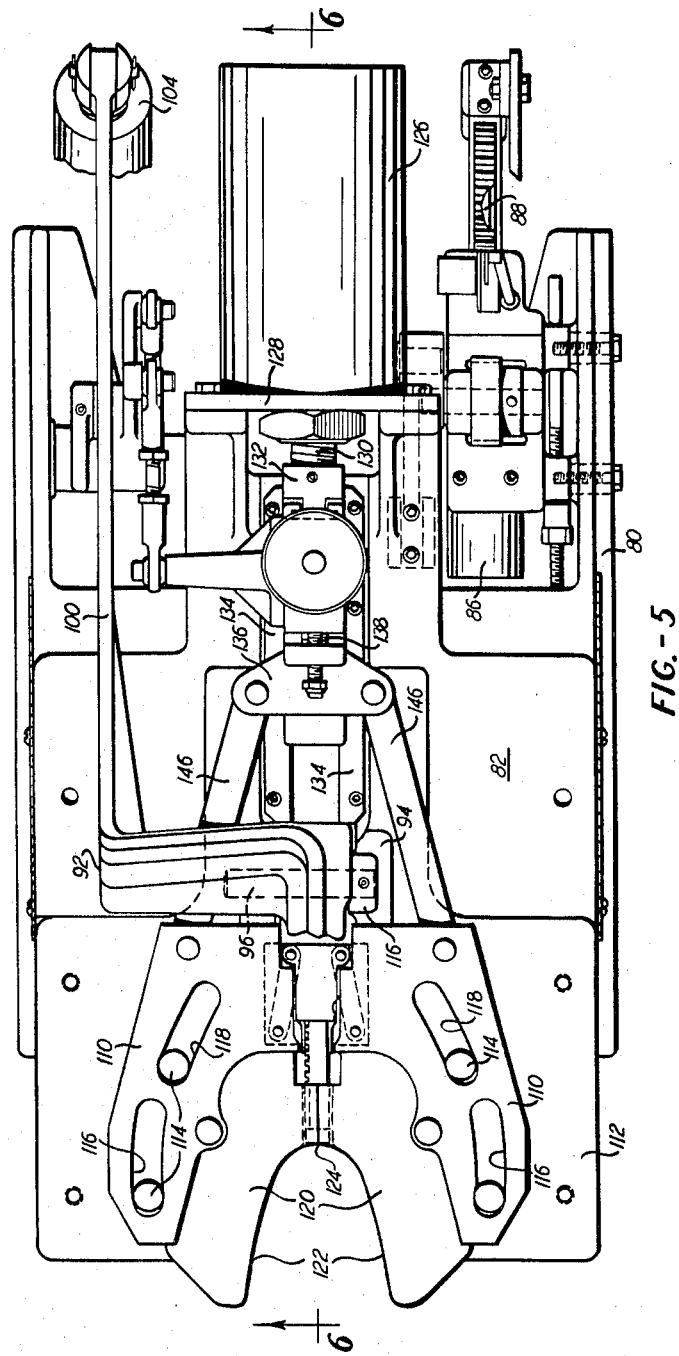
FIGURE 5 is a plan view of the wiper driving mechanism.

Referring to FIGURE 5, a drive mechanism is provided for the slide plate 82 and includes an air actuated motor 86 that is secured to the frame 10 and has a rearwardly extending piston rod 88. The piston rod 88 is operatively connected to the slide plate 82 by means fully described in U.S. application Ser. No. 581,218 filed Sept. 22, 1966 and U.S. application Ser. No. 472,525 filed July 16, 1965, it being sufficient to note here that actuation of the motor 86 may effect forward or rearward movement of the slide plate 82 between the aforesaid positions thereof.

Figure 6:
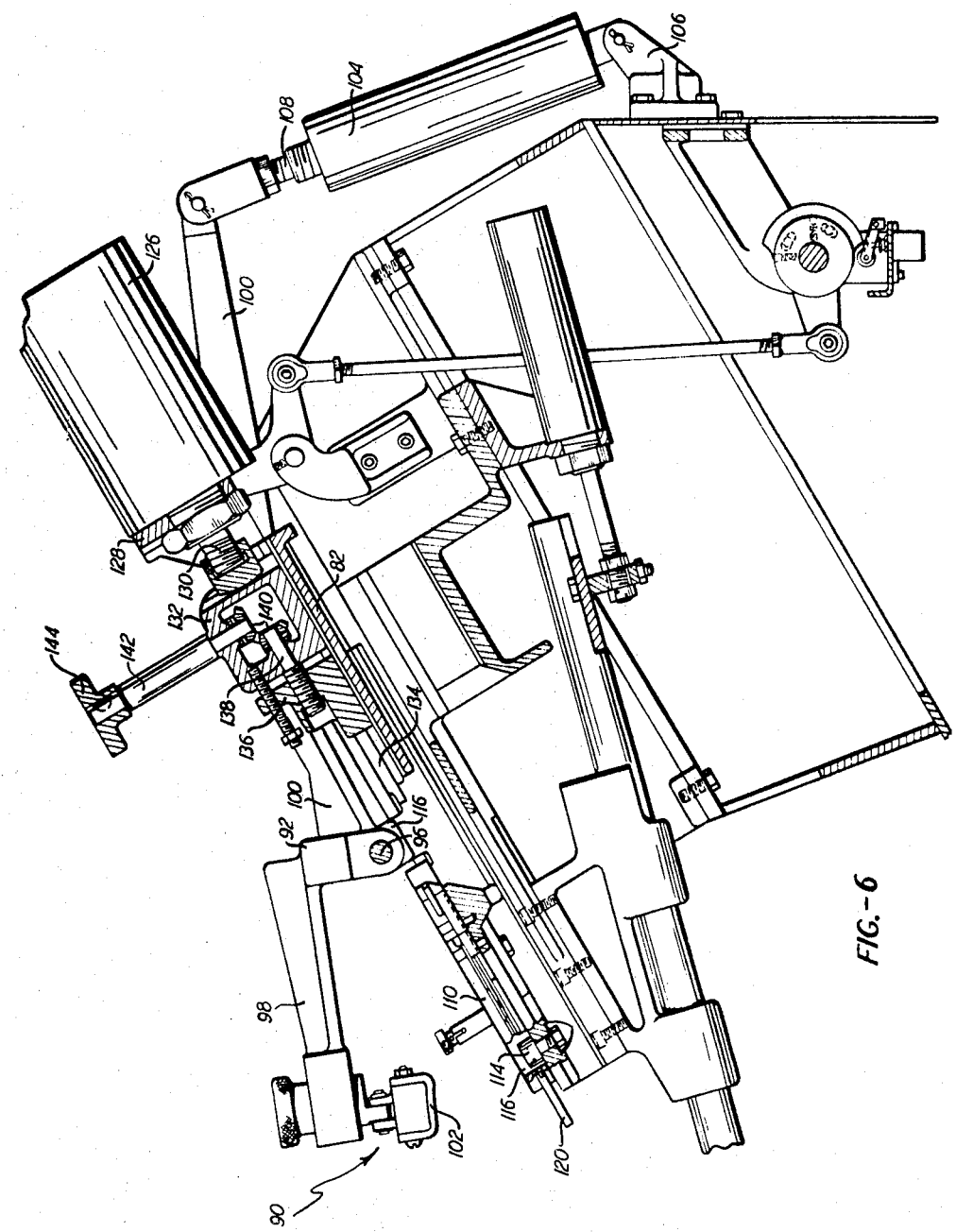
FIGURE 6 is a side elevation taken along the line 6—6 of FIGURE 5.

Referring to FIGURES 1, 5 and 6 a hold down lever 92 is pivotally mounted to the slide plate by means of trunnions 94 that extend upwardly therefrom and a pin 96, the hold down lever 92 being pivotally mounted thereto at a point intermediate its ends so that it has a forwardly extending portion 98 and a rearwardly extending portion 100. A toe hold down 90, having a flexible hold down pad 102 thereon, is secured to the forwardly extending end 98 of the lever 92. An air actuated motor 104 is pivotally mounted to a bracket 106 that is secured to the frame 10 and has a piston rod 108 that is pivoted to the rearwardly extending end 100 of the hold down lever 92 such that upon actuation of the motor 104 the hold down pad 102 may have substantially heightwise movement that is towards and away from the toe end of the shoe assembly.

A wiping device is mounted to the slide plate 82 for unitary movement therewith between the aforesaid forward and rearward positions. Referring to FIGURES 4, 5 and 6 a pair of symmetrically disposed wiper cams 110 are slidably supported on a thickened block 112 that forms the forward end of the slide plate 82. The block 112 has pins 114 upstanding therefrom that extend into cam slots 116 and 118 formed in the wiper cams 110. A pair of conventional wipers 120 having forwardly divergent edges 122 that diverge from a vertex 124 are mounted to the wiper cams 110. The movement of the wiper cams 110 and wipers 120 is governed by the configuration of the pins 114 and the cam slots 116 and 118 in the wiper cams 110. Inasmuch as the particular movement of the wipers 120 and wiper cams 110 is not germane to the subject of the instant invention reference is hereby made to the aforesaid U.S. applications Ser. No. 340,411 and Ser. No. 472,525 filed respectively on Jan. 27, 1964 and July 16, 1965 for a full disclosure thereof, it being sufficient to note here that the wipers have components of movement that are both inwardly swinging and horizontally forward. The wiping stroke of the wipers 120 is effected, as may be seen from FIGURES 5 and 6 by means of an air actuated motor 126 that is secured to a flange 128 at the rear of the slide plate 82. The piston rod 130 of the motor 126 is connected to a housing 132 that is slidably mounted in gibs 134 secured to the slide plate 82. A block 136 is slidably contained by the gibs 134 forwardly of the housing 132 and is connected to the housing by a bolt 138 that is threaded into the block 136 and extends rearwardly therefrom into the housing 132. The bolt 138 is connected by beveled gears 140 within the housing 132 to a shaft 142 that extends upwardly and out of the housing 132, a knob 144 being secured to the upwardly extending end of the shaft 142. Forwardly diverging links 146 are pivotally connected at the rearward ends to the block 136 and at their forward ends to the wiper cams 110. It may thus be seen that actuation of the motor 126 may cause the blocks and the forwardly diverging links 146 to move forwardly thereby effecting the desired movement of the wipers 120.

Referring to FIGURES 4, 7, 9, 10 and 11 a cover plate 148 is secured to the slide plate 82 and is disposed above the wiper cams 110 to restrict movement of the wiper cams 110 and hence the wipers 120 in a purely horizontal plane. The cover plate 148 has a cutout 150 formed at its forward end to accommodate a flexible, shoe-conforming yoke 152. The yoke 152 is of substantially U-shaped configuration and has a bight 154 and a pair of legs 156 extending forwardly of the bight 154 and on opposite sides thereof. The yoke 152 is made of a flexible, resilient material such as Teflon and has a spring-like backing member 158 secured to and extending exteriorly of each yoke leg 156 from the bight 154 forwardly thereof. The backing member 158 is so constructed as to yieldably urge the yoke legs 156 inwardly. Secured to the bight 154 of the yoke 152 is a clip 160 which is receivable in a socket 162 formed on a slide 161 which in turn is disposed between and is slidably supported for forward and rearward movement on forwardly extending rails 163 that are an integral part of a bracket 164. A pin 165 is secured to the slide 161 and is disposed in the socket 162 so as to be engageable with the clip 160 and retain the clip 160 within the socket 162. The forward-rearward position of the clip 160 and the yoke 152 secured thereto may be adjusted with respect to the bracket 164 by means of a screw 167 (see FIGURE 13) that is secured to and extends forwardly of the bracket 164. A nut 169 is threaded onto the screw 167 with the lower end of the nut being captured in a slot 171 formed on the slide 161 wherefrom it may be seen that rotation of the nut 169 may effect forward and rearward adjustment of the slide 161 and yoke 152 to accommodate the yoke 152 to the particular size of shoe being made in the machine. The bracket 164 is supported on the cover plate 148 for movement in a forward-rearward direction to carry the yoke 152 therewith in a manner and for a purpose described below.

A forwardly extending protrusion 170 that is integral with the cover plate 148 is located on each side of the yoke 152. A horizontal slot 172 is formed in the forward end of each protrusion 170, and each slot receives a drive bar 168 that extends laterally through the slot. A lip 174 secured to each of the drive bars 168 is also contained within its associated slot 172 and serves to preclude rotation of its associated drive bar 168 about a horizontal axis. The upper and lower surfaces of the lip 174 are provided with Teflon pads 175 to reduce friction in the mechanism. Each drive bar 168 is supported by a drive bar mount 176 which in turn is pivotally connected at its outer portion by a pin 178 to a bell crank 180 which is in turn pivoted to the cover plate 148 by means of a bracket 182 and a pin 184. An air operated motor 186, that is pivotally secured to the cover plate 148 by means of a bracket 188 and a pin 190, has a forwardly extending piston rod 192 that in turn is pivotally connected to the bell crank 180 at a pin 194.

The drive bar mount 176 includes a block 196 and a hollow screw 198 that is secured to and extends outwardly of the block 196. The outward end of each drive bar 168 is contained within the hollow of its associated screw 198 and has a pin 202 that is secured to the outward end 200 of each drive bar 168 and extends through slots 204 formed in each screw 198. A nut 206, having an annular groove 208 formed therein, is threaded onto each screw 198, with the ends of each pin 202 protruding into an annular groove 208. It may be seen that rotation of each nut 206 may effect inward or outward adjustment of its associated drive bar 168 and hence the spacing of the yoke legs 156.

A link 212 is pivoted to the inner end of each drive bar 168 by a pin 210 that constitutes an outer pivotal connection. Each link 212 extends in an inward and forward direction from its pin 210 and is pivotally mounted at its inward and forward end by a pin 214 to a block 216. Each block 216 is secured to the front end of a yoke leg 156. A stop shoulder 218, which is formed at the outer end of each link 212, is adapted to abut against its associated drive bar 168 to limit the extent of rearward pivotal movement of the links 212 with respect to the drive bars 168 about the axes of the outer pivotal connections formed by the pins 210.

A pair of bores 220 are formed within each of the protrusions 170 which intersect their associated slots 172 and which contain pistons 222 and 224. A cam follower 226 is rotatably mounted to each piston 222 by means of a block 227 which is secured to the piston 222 and which is engageable with the piston 224. Pressurized air is introduced via fittings 231 and passageways 229 in the protrusions 170 to the bores 220 to urge the pistons 222, 224 and the cam followers 226 toward the rear sides of their associated drive bars 168. When the cam followers 226 are in their most forward positions, a clearance exists between the rear ends 228 of the slots 172 and the rear ends of the blocks 227. A cam 252 is secured to an outer segment of the rear face of each drive bar 168 in alignment with its associated cam follower 226. The extent of rise of the cams 252 are equal to the clearances referred to in the preceding sentence.

Figure 9:
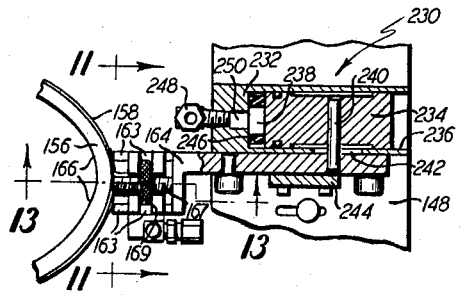
FIGURE 9 is a sectional view of the yoke retraction unit taken along the line 9—9 of FIGURE 10.
Figure 10:
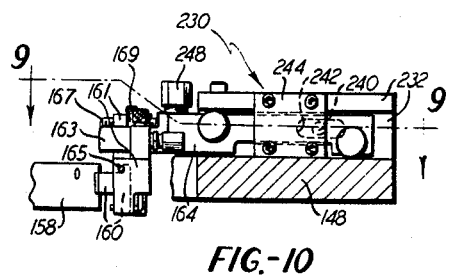
FIGURE 10 is a side elevation of the yoke retraction unit.
Figure 11:
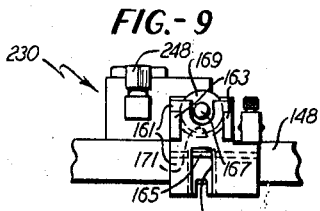
FIGURE 11 is a front elevation of the yoke retraction unit taken along the line 11—11 of FIGURE 9.

A yoke retracting drive unit 230 is operatively associated with the yoke 152 and includes a housing 232 which is secured to the cover plate 148 (see FIGURES 9, 10, 11). A piston 234 is slidably contained within a forwardly-rearwardly extending bore 236 that is formed within the housing 232, the forwardmost end of the bore cooperating with the piston 234 to define an enclosed chamber 238. A pin 240 is secured to the piston 234 and extends laterally through a slot 242 formed in the housing 232. The outwardly extending end of the pin 240 is in turn secured to the bracket 164 which is retained for forward and rearward movement with respect to the housing 232 by means of a retaining plate 244 that is secured to the housing 232 to enclose and guide the bracket 164 for movement in a forward and rearward direction in response to forward and rearward movement of the piston 234 within the bore 236. A compressible spacer 246 is located at the forward end of the bore 236 and may be engaged and compressed by the piston 234 in a manner and for a purpose described below. The spacer 246 is made from rubber or other compressible, resilient material. It is sufficient for present purposes to note that engagement of the piston 234 with the spacer determines the normal forward, working position of the yoke 152, the spacer 246 thus serving as a stop member. A source of air under pressure is in communication with the enclosed chamber 238 by means of the fitting 248 and a passageway 250 formed within the housing 232. It may thus be seen that when air under a relatively high pressure is introduced to the enclosed chamber 238 the piston 234, bracket 164 and yoke 152 which is mounted to the forwardly extending end of the bracket 164 may be urged rearwardly in unison, the rearward directed force of the piston being sufficient to overcome the forward biasing of the yoke 152 by the pistons 222, 224.

In the idle condition of the machine: the motor 16 and the insole rest assembly 28 carried thereby is in a lowered position; the motor 48 and the adhesive applicator 62 are in the FIGURE 3 position; the motor 86 maintains the slide plate 82 in a rearward out-of-the-way position; the piston rod 108 is retracted into the motor 104 so that the hold-down pad 102 is in an upper position; the piston rod 130 is retracted into the motor 126 so that the wipers 120 are in a rearward open position; the piston rods 192 are retracted into the motors 186 so that the drive bars 168 are in outer positions; the pistons 222, 224 are urged forwardly under pressurized air to thereby urge the drive bars 168 forwardly about the axes of the pins 178 to an extent determined by the abutment of the piston 234 with the compressible spacer 246, thus setting the position of the yoke 152; and there is no pressurized air entering the yoke retracting unit 230. At this time, the inner ends of the cams 252 are located outwardly of the cam followers 226. Because of the inward spring forces imparted to the yoke legs 156 by the backing member 158, the shoulders 218 of the links 212 are abutting against the drive bars 168 as indicated in FIGURE 7.

Figure 14:
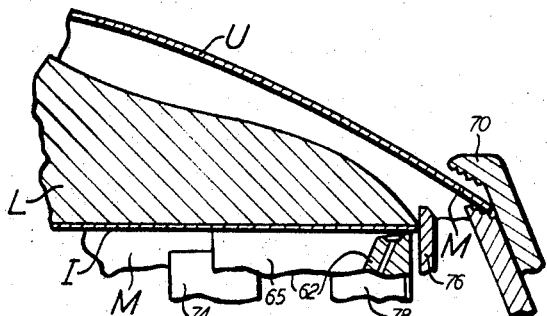
FIGURE 14 is a representation of the shoe assembly when it is initially placed in the machine.

Referring to FIGURE 14, the operator places a shoe assembly, that includes a last L having an insole I located at the bottom thereof and a shoe upper U draped thereabout, in the machine in a bottom-down position with the toe end of the shoe assembly extending rearwardly. The toe end of the shoe assembly is placed on the adhesive applicator 62 and the shoe assembly is then urged rearwardly so that the peripheral portion of the toe end of the last may be brought into abutment with the adjacent sides of the retarders 76 and 78 that embrace the adhesive applicator 62 and extend upwardly thereof when in idle position. Thus the retarders 76 and 78 also serve to aid in the positioning of the shoe assembly in the machine. When the operator determines that the shoe assembly is properly positioned he actuates the control circuit as fully disclosed in the aforementioned U.S. applications to thereby cause the toe pincer 68 to close and grip the upper margin M as shown in FIGURE 15. After inspecting the shoe assembly to determine if the toe pincer 68 has properly gripped the upper margin M the operator then actuates the control circuit to cause the side pincers 66 to grip the side portions of the upper margin M and to thereafter effect a downward moving of the toe and side pincers 66 and 68 thereby stretching the upper about the last. As the toe and side pincers 66 and 68 move downwardly, the shoe assembly is pulled downwardly therewith and urges the adhesive applicator 62 to move downwardly therewith, the adhesive applicator 62 being mounted to the machine for yieldable downward and limited tilting movement as fully described in the aforesaid U.S. applications. The downward movement of the shoe assembly and the adhesive applicator 62 is terminated when the bottom of the insole I is brought into abutting engagement with the rigid insole rest assembly 28 (see FIGURE 15). The control circuit then causes the machine to pause in its cycle to permit further inspection of the disposition of the shoe assembly therein and the pulling over of the upper about the last. The control circuit is then reactivated to cause actuation of the motor 86 to move the slide plate 82 and the wipers 120 and the yoke 152 supported thereon from a rearward, out-of-the-way position to the forward, working position indicated in phantom in FIGURE 15. At or about the time when the slide plate 82 reaches its forward position the control circuit causes actuation of the motor 16 to raise the post 22 and the pulled over shoe assembly therewith. Adhesive may be extruded from the adhesive applicator 62 onto the bottom of the insole I during this upward movement of the toe post 22. During the rise of the toe post 22, the motor 104 is actuated to cause the toe holddown 90 to move downwardly and lightly clamp the forepart of the shoe assembly against the insole rest assembly 28 and to thereafter yieldably ride upwardly with the shoe assembly so as to maintain its clamping function throughout the rise thereof. The control circuit is arranged so as to insure that the slide plate 82 is in its fully forward position before the toe post 22 has been raised to a height wherein the shoe assembly may engage the inner wall 166 of the yoke 152.

Figure 16:
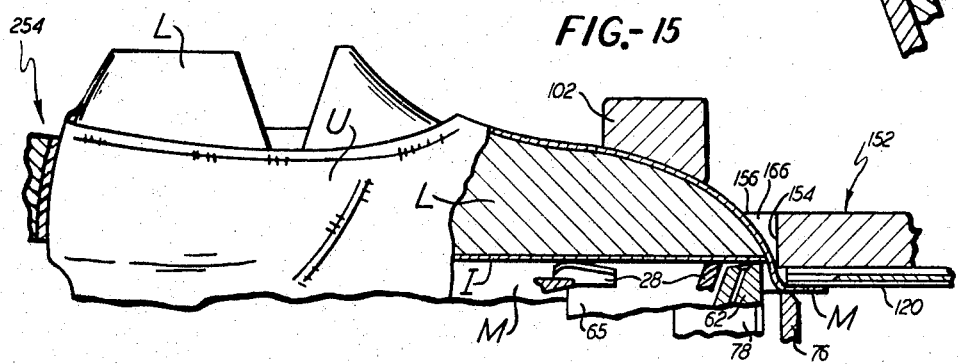
FIGURE 16 is a representation of the shoe assembly after it has been raised through the yoke to complete the upwiping operation and further illustrating the level of the bottom of the insole being slightly higher than the level of the tops of the wipers in readiness for the wiping operation.
Figure 18:
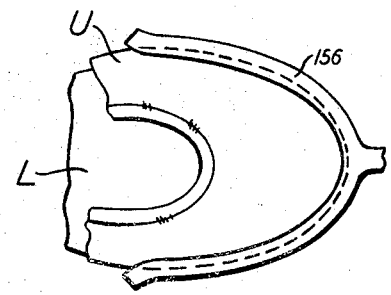
FIGURE 18 is a plan view representing the shoe assembly and the yoke during the upwiping operation.

The toe post 22 is raised by the motor 16 an amount such that the insole bottom is located above the tops of the wipers 120 an amount that is approximately equal to the thickness of the upper margin M, as indicated in FIGURE 16. The shoe assembly was so placed in the machine that when the yoke 152 was moved to its forward working position the edges of the last L overlapped the inner wall 166 of the yoke as indicated in FIGURE 18. During the rise of the shoe assembly, the upper U is snugly engaged by the yoke wall 166 to thereby cause the upper to conform to the shape of the last in an upwiping operation. During the engagement of the upper by the yoke wall, the yoke is initially compressed and then the yoke legs 156 are moved outwardly and the yoke bight 154 may move rearwardly. The outward movement of the yoke legs takes place against the inward spring force imparted thereto by the backing member 158 with the links 212 swinging forwardly about the axes of the pins 210 and the shoulders 218 moving away from the drive bars 168. The rearward movement of the yoke bight takes place with the piston 234 moving rearwardly in the bore 236 away from the spacer 246 and the bars 168 swinging about the pins 178 to force the cam followers 226 rearwardly.

After the shoe assembly has completed its rise, the motors 186 are actuated to move their piston rods 192 forwardly. This causes the drive bars 168 to move inwardly and the cams 252 to engage the cam followers 226. The engagement of the cams 252 with the cam followers 226 causes the cam followers together with the pistons 222, 224 to move rearwardly against the force of the pressurized air entering the bores 220, as permitted by the clearance between the rear ends 228 of the slots 172 and the rear ends of the blocks 227, the rear ends 228 thus serving as limiting members. The drive bars 168 thus have substantially rectilinear inward movement imparted thereto while being guided by the cam followers 226. As described above, the links 212 swing forwardly about the axes of the pins 210 with the shoulders 218 moving away from the drive bars 168 during the rise of the shoe assembly. The inward movement of the drive bars 168 causes the links 212 to swing further forwardly about the axes of the pins 210 and thereby move the yoke legs 156 inwardly and forwardly (heelwardly) to thereby cause the yoke 152 to press against the shoe assembly under a heavier pressure than had heretofore been applied by the pistons 222, 224 and thus cause the yoke to apply a clamping force to the shoe assembly for the below described wiping operation.

A heel clamp 254 (FIGURE 1), incorporated into the machine so as to be located forwardly of the insole rest assembly 28, is mounted for forward-rearward movement that is towards and away from the shoe assembly so as to be engageable with the heel end thereof. At about the time as the toe post 22 and the shoe assembly supported thereon complete their rise, the heel clamp 254 is caused to move rearwardly to engage the shoe assembly just after its rise is completed and thus augment the clamping action of the yoke 152. As the toe post 22 rises to bring the shoe assembly through the yoke 152 and to a proper level with respect to the wipers 120, the front pincers 68 are caused to release the toe end of the upper margin and be moved downwardly away from the shoe assembly so as not to mechanically interfere with the bottom surface of the wipers 120. Also during the rise of the toe post 22, the adhesive extruding device may be actuated to deposit a bead of adhesive on the bottom of the insole. As the toe post 22 nears completion of its rise the toe and side pincers 68, 66 are caused to release their gripping of the upper margin and the retarders 76 and 78 are forced upwardly against the forepart of the upper to press the upper margin against the wiper bottoms to thereby aid in maintaining the upper in its pulled-over condition as illustrated in FIGURE 16. Thus the shoe assembly is rigidly clamped in position by means of cooperation of the heel clamp 254, the insole rest assembly 28 and the toe holddown 90 with the upper being maintained in its pulled-over condition by means of cooperation of the yoke 152 and the pressing of the upper margin between the retarders 76 and 78 and the bottom surface of the wipers 120.

The control circuit then causes actuation of the motor 126 to cause this motor to move its piston rod 130 forwardly. The forward movement of the piston rod 130, through the housing 132, the block 136 and the links 146, causes the wiper cams 110 and the wipers 120 carried thereby to move with respect to the block 112 in a wiper stroke in a path determined by the configuration of the cam slots 116, 118 to thereby wipe or fold the upper margin M against the insole I and adhesively attach it thereto by means of the adhesive that had been applied to the insole through the applicator 62.

During the wiper stroke the adhesive applicator 62 is first lowered out of the path of movement of the oncoming wipers 120. After this, the pressures applied by the retarders 76 and 78, forcing the upper margin M against the wiper bottoms is relieved, the timing being such that this takes place after the wipers have crossed under the insole and have started to wipe the upper margin against the insole so that the stretching of the upper about the last that had been maintained by the retarders 76, 78 is taken over by the wipers 120 with the result that the stretching of the upper about the last is maintained throughout the wiping stroke. This is aided by the clamping pressure of the yoke 152 on the shoe assembly. The insole rest assembly 28 is then lowered out of the path of movement of the oncoming wipers so that the shoe assembly is supported on its bottom solely by the upper surface of the wipers 120 thus enabling the holddown 90 to press the shoe assembly downwardly directly against the wipers 120 and provide an over-wiping pressure. Towards the end of the wiping stroke the holddown 90 is caused to be forced downwardly under relatively heavy pressure for a predetermined length of time to iron the now wiped upper margin against the insole and to enable the adhesive that had been extruded between the wiped upper margin and insole to firmly bond the upper margin to the insole. At the end of this predetermined length of time the machine parts are returned by means of the control circuit to their idle positions and the shoe may be removed from the machine. It may be noted that wiper heaters 300 depend from supports 302 that are in turn secured to the cover plate 148 (see FIGURES 7 and 8). Each heater 300 is biased against its associated wiper 120 by means of springs 304 to maintain each heater 300 in conductive contact with its associated wiper 120. The conductively heated wipers aid in ironing the upper margin against the insole and pressing out any irregularities or pleats in the upper margin caused as a result of the wiping operation.

Figure 19:
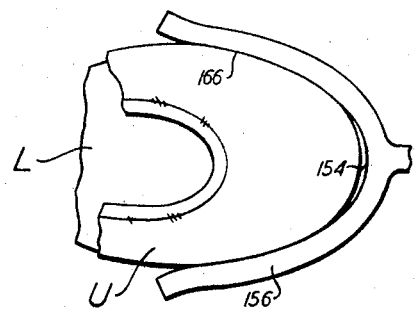
FIGURE 19 is an illustration of an imperfect fit between the yoke and shoe assembly wherein the yoke bight is spaced from the tip of the shoe assembly.

The foregoing mode of operation of the machine, and particularly that of the yoke 152 and its associated mechanisms, has been descirbed as operating under ideal conditions wherein the yoke 152 was contoured perfectly with respect to the particular shoe assembly. It may sometimes happen, however, that after the shoe assembly has been raised to the wiping level and although the yoke 152 is biased forwardly by the pistons 222, 224 to a forward position wherein the piston 234 of the yoke retraction unit 230 is in forward abutment with the compressible spacer 246, the bight 154 of the yoke 152 is not engagement with the tip of the toe of the shoe assembly but is spaced therefrom as illustrated in FIGURE 19. Such a condition may be caused by any of a number of factors including improper placement of the shoe assembly on the insole rest assembly 28 such that the shoe assembly is too far forward, improper adjustment of the nut 171 such that the bight 154 of the yoke 152 is too far rearward with respect to the bracket 164 or spreading the legs 156 of the yoke 152 by rotation of the nuts 206 to accommodate a larger shoe assembly to a degree wherein the contour of the inner wall 166 of the yoke 152 is distorted and no longer parallels the periphery of the forepart of the shoe assembly. When such a condition occurs at the bight 154 of the yoke 152, the subsequent clamping of the shoe assembly by the yoke 152 will be ineffective unless the bight 154 of the yoke 152 is permitted to move forwardly into engagement with the end of the shoe assembly so that the clamping force that is applied to the yoke 152 by the motors 186 may be applied to the shoe assembly. If the clamping force, and more particularly the forwardly directed component thereof, is instead applied to a rigid structural portion of the machine and not the shoe assembly the yoke legs 156 may rupture. The compressible nature of the bushing 246 serves as a yieldable connection between the yoke 152 and the machine and permits this additional forward movement of the bight 154 of the yoke 152.

Normally the biasing of the pistons 222, 224 maintains the yoke 152 in its forward, working position which is determined by engagement of the piston 234 of the yoke retraction unit 220 with the spacer 264. The force of the pistons 222, 224 is relatively light and causes no discernible compression of the spacer 264. As the shoe assembly is raised into engagement with the inner wall 166 of the yoke 152 the overlap between the bight 154 of the yoke 152 and the shoe causes the yoke to be urged rearwardly against the force of the pistons 222, 224, the piston 234 backing off from the spacer 246. When the motors 186 are thereafter actuated to cause the clamping to take place, the bight 154 of the yoke 152 is already in engagement with the toe of the shoe assembly and if the shoe is rigidly maintained in position the full clamping force will be applied to the shoe, there being no forward movement of the bight 154 of the yoke 152. If the shoe does tend to shift slightly rearwardly, the yoke bight 154 will be able to move therewith to maintain its clamping effect.

When the non-overlapping condition illustrated in FIGURE 19 exists the clearance between the tip of the shoe and the yoke bight 154 may result in the yoke 152 not being urged rearwardly so that the piston 234 is still in engagement with the compressible spacer 246 after the rise of the shoe assembly is completed. When the motors 186 are thereafter actuated to clamp the shoe the compressibility of the spacer 246 will enable the yoke bight 154 to move forwardly and enable the yoke 152 to transmit its clamping force to the shoe assembly.

Figure 17:
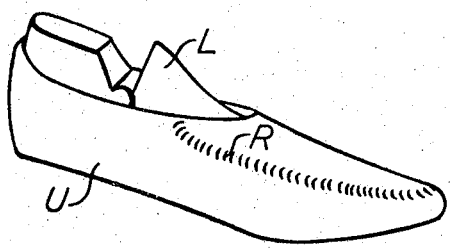
FIGURE 17 is an illustration of a moccasin-type shoe having a ridge or seamline.

In fabricating certain styles of shoes, such as moccasins having a ridge or seamline R (see FIGURE 17), it is desirable to forego the upwiping operation for a purpose fully described in application Ser. No. 581,218 filed Sept. 22, 1966. The admission of air into the chamber 238 to move the piston 234, the bracket 164 and the yoke 152 rearwardly causes the yoke to be retracted to a rearward out-of-the-way position that is out of engagement with the rising shoe assembly, thus foregoing the upwiping operation when such is desired. The control circuit of the machine is provided with means for enabling the operator to selectively permit or preclude the flow of air to the chamber 238.

Figure 12:
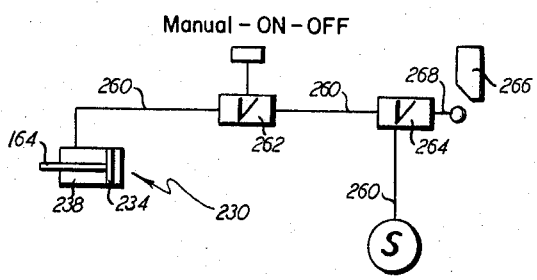
FIGURE 12 is a schematic illustration of the control circuit for operating the yoke retraction unit.

Referring to the schematic FIGURE 12 it may be seen that a portion of the control means for maintaining the yoke 152 in either of its described positions includes a source of air S under a pressure sufficient to overcome the biasing effect of the pistons 222, 224 when such air is introduced to the chamber 238 of the yoke retraction unit 230. The source of air S is communicative with the chamber 238 of the yoke retraction unit 230 by means of the line 260. A manually operated valve 262 is interposed along the line 260 and is actuable by the operator to alternatively permit or preclude the flow of air therethrough. Also interposed along the line 260 between the valve 262 and the source of air S is another valve 264 which is normally open so as to permit the flow of air from the source S to the valve 262. Referring also to FIGURE 2 it may be seen that the valve 264 is mounted to the toe post 22 for movement therewith and a cam 266 is secured to the housing 14 in a position such that when the toe post 22 has reached its uppermost position the cam 266 will be engaged by the actuating member 268 of the valve 264 to effect closure thereof. The closing of the valve 264 precludes the flow of air from the source S to the chamber 238 thereby deactuating the yoke retraction unit 230 and enabling the pistons 222, 224 which are continually biased in a forward direction to urge the yoke 152 to its forward position. The effect of this is that when the toe post 22 has completed its rise to bring the shoe assembly to its proper position, the yoke 152 will be in its forwardmost position embracing the toe end of the shoe assembly and in readiness to clamp the toe end of the shoe assembly in response to actuation of the motors 186.

When the machine is operated so as to forego the upwiping operation, the spacer 246 serves the same function as is set forth above in that when the yoke 152 is urged forwardly by the pistons 222, 224 after the rise of the shoe assembly, if the yoke bight 154 is not in engagement with the toe tip of the shoe the spacer 246 will permit the yoke 152 to move forwardly as the motors 186 are actuated.

When the machine is to be used in the manufacture of non-moccasin type shoes the operator presets the valve 262 so as to maintain the yoke retraction unit 230 in a deactuated condition thereby maintaining the yoke 152 in its forward position in readiness to perform its upwiping function when the shoe assembly is urged upwardly therethrough. When the machine is to be used in the manufacture of moccasin-type shoes (see FIGURE 17) the operator presets the valve 262 so as to actuate the yoke retraction unit 230 and urge the piston 234 rearwardly thereby overcoming the forwardly directed bias of the pistons 222, 224 and urging the yoke 152 rearwarly until the shoulder 218 on each of the links 212 engages its associated drive bar 168 whereupon each of said drive bars may pivot rearwardly about the pin 178 to draw the yoke 152 to its rearward position. When in this rearward position the yoke 152 cannot be engaged by the shoe assembly during the rise thereof but is later actuated to clamp the shoe assembly after the rise of the shoe assembly has terminated.

We claim:
1. A shoe machine comprising:
a frame;
means mounted to said frame for supporting a shoe assembly in a bottom-down position, said shoe assembly including a last having an insole located at the bottom thereof and a shoe upper draped about one end of said last;
a flexible, resilient U-shaped upwiping member having a bight and a pair of legs extending forwardly from said bight and being adapted to embrace said end of said shoe assembly, said upwiping member having an inner surface of a contour substantially paralleling that of a heightwise projection of said end of said shoe assembly, said paralleling surface of said upwiping member being of smaller dimensions than that of said projection of said end of said shoe assembly;
means mounting said upwiping member to said frame for movement between a first position wherein said upwiping member is in an out-of-the-way remote position and a second position wherein said upwiping member is in a working position that is above and in paralleling, overlapping relationship to said end of said shoe assembly when said shoe assembly is supported on said supporting means;
bias means supported on said frame and being operatively connected to the forwardmost ends of said legs of said upwiping member and being effective to bias said upwiping member in said second position;
means for effecting relative heightwise movement between said shoe assembly support means and said upwiping member so as to cause engagement of said end of said shoe assembly with said end of said shoe assembly with said paralleling surface of said upwiping member when said upwiping member is in said second position, said means for effecting said relative heightwise movement being of such construction as to continue said relative heightwise movement subsequent to engagement of said shoe assembly with said paralleling surface of said upwiping member whereby said flexible resilient construction of said upwiping member may effect a pressing of said upper to said last during said relative heightwise movement to thereby stretch the upper about and into conformity with said last;
drive means mounted to said frame and being connected to said bight of said upwiping member and being effective to urge said upwiping member to said first rearward position, said drive means overcoming the effect of said bias means during said operation thereof; and
first control means associated with said drive means and being effective to actuate said drive means to selectively urge said upwiping member to said first position thereof or to enable said bias means to urge said upwiping member to said second position thereof so as to alternatively preclude or permit engagement of said upwiping member with said shoe assembly during said relative heightwise movement thereof.

2. An apparatus as recited in claim 1 wherein said means mounting said upwiping member to said frame for movement between said first and second positions comprises:
a support bracket mounted to said frame rearwardly of said upwiping member for movement in a forward-rearward direction;
means connecting the bight of said upwiping member to said support bracket for movement therewith;
and wherein said drive means for urging said upwiping member to said first position comprises:
a cylinder mounted to said frame;
a piston slidably mounted in said cylinded for movement in a forward-rearward direction, the forward end of said cylinder and said piston defining an enclosed chamber;
means connecting said support bracket to said piston for movement therewith;
stop means limiting the extent of forward movement of said piston within said cylinder such that when said piston is in engagement with said stop means said upwiping may be in said forward second position; and
means for introducing fluid under pressure to said chamber to thereby urge said piston from said forward position to a rearward position.

3. An apparatus as recited in claim 2 further comprising:
second control means operatively associated with said means for introducing fluid under pressure to said chamber and being effective to preclude flow of said fluid to said chamber so as to terminate said rearward urging of said piston thereby enabling said bias means to urge said upwiping member towards said second position,
said second control means being actuable in response to the termination of said relative heightwise movement of said upwiping member and said shoe assembly support.

4. An apparatus as recited in claim 2 further comprising:
a drive member supported on said frame laterally of and at each side of said upwiping member and being mounted for movement on said frame in a forward and rearward direction;

means connecting each of said drive members to one of said legs of said upwiping member;

a plunger disposed on said frame on each side of upwiping member, rearwardly of each of said drive members, each of said plungers being contained for forward and rearward movement within a bore formed within said frame, each of said plungers and bores being arranged such that said plungers may engage said drive member upon forward movement of said plungers;

means continually introducing fluid under pressure to said bores so as to bias said plungers forwardly; and stop means engageable with each of said plungers to limit the extent of rearward movement of each of said plungers thereby limiting the extent of rearward movement of said upwiping member and precluding rearward movement thereof beyond said first remote position in response to introduction of fluid under pressure to said enclosed chamber.

5. An apparatus as recited in claim 1 further comprising:

second control means operatively associated with said drive means and being effective to deactuate said drive means in response to the termination of said relative heightwise movement of said upwiping member and said shoe assembly thereby insuring that subsequent to the termination of said relative heightwise movement said bias means may urge said upwiping member towards said second position thereof.

6. A shoe machine comprising:

a frame;

means mounted to said frame for supporting a shoe assembly that includes a last having a shoe upper draped about one end of said last;

a flexible, U-shaped end clamping member having a bight and a pair of legs extending forwardly from said bight and being adapted to embrace said end of said shoe assembly;

means for effecting relative movement between said end clamping member and said shoe assembly supporting means so as to cause said end clamping member to embracingly engage said end of said shoe assembly;

drive means mounted to said frame on each side of said end clamping member, each of said drive means having a drive bar that is movable laterally of said shoe assembly supporting means and in a direction that is towards and away from said end clamping member;

a link pivotally connected to the inwardly extending end of each of said drive bars and extending therefrom forwardly and inwardly towards the forwardly extending legs of said end clamping members, said forwardly and inwardly extending ends of said link being pivotally connected to said legs of said end clamping member, whereby when said end clamping member is in embracing engagement with said end of said shoe assembly actuation of said drive means may cause said end clamping member to be tightly wrapped about said end of said shoe assembly;

a cam connected to each of said drive bars for movement in unison therewith, each of said cams having a rise that extends rearwardly of its associated drive bar;

a cam follower mounted to said frame for movement in a forward and rearward direction and being so disposed that when said cam follower is urged forwardly it will be in engagement with said cam of its associated drive bar;

stop means limiting the extent of rearward movement of each of said cam followers;

means urging said cam followers forwardly into engagement with said cams, whereby upon actuation of said drive bars inwardly towards said end clamping member said cams may effect rearward movement of said cam followers into engagement with said stop means thereby precluding further rearward movement of said cam followers, said cams and said drive bars; and means precluding rearward pivotal movement of said inner end of each of said links beyond a predetermined rearwardly pivoted position thereof.

7. A shoe machine comprising:

a frame;

means mounted to said frame for supporting a shoe assembly in a bottom-down position, said shoe assembly including a last having an insole located at the bottom thereof and a shoe upper draped about one end of said last;

a flexible, resilient, U-shaped, upwiping member having a bight and a pair of legs extending forwardly from said bight and being adapted to embrace said end of said shoe assembly, said upwiping member having an inner surface of a contour substantially paralleling that of a heightwise projection of said end of said shoe assembly, said paralleling surface of said upwiping member being of smaller dimensions than that of said projection of said end of said shoe assembly;

means mounting said bight of said upwiping member to said frame for movement between a first position wherein said upwiping member is in a rearward, out-of-the-way, remote positon and a second position wherein said upwiping member is in a forward working position that is above and in paralleling, overlapping relationship with said end of said shoe assembly when said shoe assembly is supported on said supporting means;

first drive means mounted to said frame on each side of said upwiping member, each of said first drive means having a drive member that is movable laterally of said shoe assembly supporting means in a direction that is towards and away from said upwiping member;

means mounting each of said drive members for further movement that is in a forward and rearward direction;

linkage means connecting each of said forwardly extending legs of said upwiping member to one of said drive bars, said linkage means being of a construction such that upon operation of said first drive means to move said drive members inwardly towards said upwiping member, said legs of said upwiping member may be urged in a direction having components that are both forwardly and inwardly directed;

bias means supported on said frame and being in operative engagement with each of said drive members so as to urge said drive members forwardly, said linkage means being effective to carry said upwiping member to said forward second position in response to said forward biasing of said drive members;

means for effecting relative heightwise movement between said shoe assembly support means and said upwiping member so as to cause engagement of said end of said shoe assembly with said paralleling surface of said upwiping member when said upwiping member is in said second position, said means for effecting said relative heightwise movement being of such construction as to continue said relative heightwise movement subsequent to engagement of said shoe assembly with said paralleling surface of said upwiping member whereby said flexible, resilient construction thereof may effect a stretching of said upper about and into conformity with the contour of said last;

means for thereafter actuating said first drive means to move said drive members inwardly thereby urging said legs of said upwiping member in a forward and inward direction to cause said upper to be clamped tightly to said end of said last;

means for precluding rearward movement of said upwiping member so as to maintain said upwiping member in said second position while said drive members are moved inwardly to clamp said end of said shoe assembly;

second drive means operatively connected with said bight of said upwiping member for urging said upwiping member rearwardly to said first position and overcoming said effect of said bias means;

means for alternatively operating said second drive means during operation of said means for effecting relative heightwise movement between said shoe assembly support means and said upwiping member such that during said relative movement said upwiping member may be maintained out of engagement with said shoe assembly; and means responsive to the termination of said relative heightwise movement of said shoe assembly support means and said upwiping member to deactuate said second drive means thereby enabling said bias means to urge said upwiping member towards said second position prior to actuation of said first drive means to effect said clamping operation.

8. An apparatus as recited in claim 7 wherein said bias means for urging said drive members forwardly comprises a plunger disposed on said frame on each side of said upwiping member and rearwardly of each of said drive members, each of said plungers being contained for forward and rearward movement within a bore formed within said frame, each of said plungers and bores being arranged such that said plungers may engage said drive member upon forward movement thereof; and means yieldably urging said plungers in a forward direction.

9. An apparatus as recited claim 8 wherein said linkage means comprises:

a link pivotally connected to the inner end of each drive bar and extending therefrom forwardly and inwardly towards the forwardly extending legs of said upwiping member, said forwardly and inwardly extending ends of said links being pivotally connected to said ends of said legs of said upwiping member;

and wherein said means for precluding rearward movement of said upwiping member beyond said second position comprises:

an abutment surface formed on each link and being so disposed thereon as to be engageable with said drive members when the forwardly and inwardly extending ends of said link are pivoted in a rearward direction thereby precluding further rearward pivoting movement of said links with respect to said drive members;

stop means for limiting the extent of rearward movement of said plungers;

means for urging said plungers rearwardly into engagement with said stop means therefor; and means for maintaining said drive members in said forward position thereof.

10. An apparatus as recited in claim 9 wherein said means for urging said plungers rearwardly into engagement with said stop means and wherein said means for maintaining said drive members in said forward positions thereof comprises:

a cam mounted to and extending rearwardly from each of said drive members for movement therewith, each of said cams being normally disposed outwardly of the point of contact of said plungers with said drive members such that upon inward movement of said drive members said cams may engage the forward ends of said plungers thereby urging said plungers rearwardly against said stop means while maintaining said drive members in their aforesaid forward positions.

11. An apparatus as recited in claim 7 further comprising:

means for enabling said upwiping member to move forwardly beyond said second position in response to actuation of said first drive means whereby if said bight of said upwiping member is not in engagement with said end of said shoe assembly after said relative heightwise movement of said shoe assembly support and said upwiping member, actuation of said first drive means may cause said upwiping member to move forwardly beyond said second position to cause said bight of said upwiping member to engage said end of said shoe assembly whereupon said clamping force may be applied to said shoe assembly.

12. A shoe machine comprising:

a frame;

means mounted to said frame for supporting a shoe assembly that includes a last having a shoe upper draped about one end thereof and in such a manner that said end of said shoe assembly extends rearwardly;

a flexible, substantially U-shaped end clamp having a bight and a pair of legs extending forwardly from said bight and being adapted to embrace said end of said shoe assembly;

means mounting said end clamp to said frame for movement between a first position wherein said end clamp is in a rearward, remote position and a second, forward, working position wherein said end clamp is in embracing relationship with said end of said shoe assembly;

second drive means operatively connected to said end clamp for effecting said movement thereof between said first and second positions;

first drive means operatively connected with said end clamp and being actuable when said end clamp is in embracing relationship with said end of said shoe assembly;

said first drive means being so constructed and arranged as to urge said legs of said end clamps forwardly whereby said bight of said end clamp may be wrapped tightly about said end of said shoe assembly; and means for enabling said end clamp to move forwardly beyond said second position in response to actuation of said first drive means whereby if said bight of said end clamp is not in engagement with said end of said shoe assembly when said end clamp is in said second position thereof, actuation of said first drive means may cause said end clamp to move forwardly beyond said second position to cause said bight of said end clamp to engage said end of said shoe assembly whereupon said clamping force may be applied to said shoe assembly.

13. A machine as recited in claim 12 wherein said means for enabling said end clamp to move forwardly beyond said second position comprises:

yieldable connecting means connecting said end clamp to said frame, said connecting means being so constructed and arranged as to enable forward movement of said end clamp beyond said second position in response to actuation of said first drive means.

14. A machine as recited in claim 12 wherein said end clamp is rigidly connected to a portion of said second drive means for movement therewith and wherein the means determining said second, forward, working position of said end clamp comprises:

a stop member so disposed in said machine as to be abuttingly engageable with said portion of said second drive means when said end clamp is being moved forwardly to said second position;

and wherein said means enabling said end clamp to move forwardly beyond said second position comprises:

said stop member being of a compressible nature whereby when said end clamp is in said second position thereof actuation of said first drive means to urge said legs of said end clamp forwardly may cause said stop member to be compressed, thus enabling said portion of said second drive means and said end clamp to move forwardly beyond said second position.

15. A machine as recited in claim 12, wherein at least a portion of said second drive means comprises:

a motor having a forwardly-rearwardly extending bore, a piston slidably contained within said bore and a piston rod secured to said piston and extending forwardly therefrom, said end clamp being secured to the forwardly extending end of said piston rod;

and wherein the means determining said second, forward, working position of said end clamp comprises a spacer contained within and at the forward end of said bore so as to be abuttingly engageable with said piston such that when said piston is in abutment with said spacer said end clamp is in said second position thereof;

and wherein said means enabling said end clamp to move forwardly beyond said second position comprises:

said spacer being fabricated from a compressible material.

16. A lasting machine comprising: a support for supporting bottom-down a shoe assembly that comprises a last having an insole on its bottom and an upper draped thereabout with a selected end of the shoe assembly facing rearwardly; a flexible yoke having a bight and a pair of legs extending forwardly of the bight; means so constructing the yoke as to yieldably urge the legs inwardly; a bar located outwardly of each yoke leg; a link, extending inwardly and forwardly from each bar towards its associated yoke leg, that is pivoted at its outer end by an outer pivotal connection to a bar and is pivoted at its inner end to a yoke leg; stop means interposed between each link and its associated bar for limiting the extent that the links may swing rearwardly about said outer pivotal connections under the yieldable inward urging of the yoke legs; means for initially positioning the support so that said end of the shoe assembly is below the yoke with the inner periphery of the yoke overlapping the outer periphery of said end of the shoe assembly; and means for thereafter imparting relative rising movement of the support with respect to the yoke to thereby cause the yoke to engage the upper and conform it to the shape of the last with the links swinging forwardly about said outer pivotal connections.

17. The machine as defined in claim 16 further comprising: wiping means located below the yoke and mounted for movement between a retracted position and an advanced position in a wiping stroke to wipe the margin of said end of the upper against the insole; means for initially retaining the wiping means in its retracted position; means operative subsequent to the completion of said relative rising movement to drive said bars inwardly and cause the links to swing further forwardly about said outer pivotal connections to thereby effect a clamping pressure of the yoke against the shoe assembly; and means for thereafter imparting a wiping stroke to the wiping means.

18. The machine as defined in claim 16 further comprising: means mounting the bars for forward-rearward movement; force applying means yieldably urging the bars forwardly to thereby urge the yoke forwardly; and a stop so positioned as to limit the extent of forward movement of the yoke under the influence of said force applying means.

19. The machine as defined in claim 18 further comprising: a piston, connected to the yoke bight, mounted for forward-rearward movement; and wherein said stop comprises: a spacer in alignment with and located forwardly of the piston.

20. The machine as defined in claim 18 further comprising: a second force applying means actuable to overcome said first mentioned force applying means and thereby move the bars, together with the yoke, rearwardly so as to preclude said engagement of the yoke and the upper during said relative rising movement; and optionally operable means for actuating said second force applying means.

21 The machine as defined in claim 17 further comprising: means mounting the bars for forward-rearward movement; force applying means yieldably urging the bars forwardly; and a stop so positioned as to limit the extent of forward movement of the bars under the influence of said force applying means.

22. The machine as defined in claim 21 further comprising: a piston, connected to the yoke bight, mounted for forward-rearward movement; and wherein said stop comprises: a spacer in alignment with and located forwardly of the piston.

23. The machine as defined in claim 21 further comprising: second force applying means actuable to overcome said first mentioned force applying means and thereby move the bars, together with the yoke, rearwardly so as to preclude said engagement of the yoke and upper during said relative heightwise movement; optionally operable means for actuating said second force applying means during said relative rising movement; and means, effective subsequent to the completion of said relative rising movement and prior to the driving of the bars inwardly, to deactuate said second force applying means.

24. The machine as defined in claim 21 further comprising: second force applying means actuable to move the piston rearwardly away from the spacer and overcome said first mentioned force applying means and thereby move the bars, together with the yoke, rearwardly so as to preclude engagement of the yoke and upper during said relative heightwise movement; optionally operable means for actuating said second force applying means during said relative rising movement; and means, effective subsequent to the completion of said relative rising movement and prior to the driving of the bars inwardly, to deactuate the second force applying means.

25. A lasting machine comprising: a support for supporting bottom-down a shoe assembly that comprises a last having an insole on its bottom and an upper draped thereabout with a selected end of the shoe assembly facing rearwardly; a flexible yoke having a bight and a pair of legs extending forwardly of the bight; means so constructing the yoke as to yieldably urge the legs inwardly; a bar located outwardly of each yoke leg; means mounting each bar for inward-outward movement; a link, extending inwardly and forwardly from each bar towards its associated yoke leg, that is pivoted at its outer end by an outer pivotal connection to a bar and is pivoted at its inner end to a yoke leg; stop means interposed between each link and its associated bar for limiting the extent that the links may swing rearwardly about said outer pivotal connections under the yieldable inward urging of the yoke legs; means pivotally mounting the outer portion of each bar about an axis for swinging forward-rearward movement; a cam fixed to and extending rearwardly of an outer segment of each bar; a cam follower, mounted for forward-rearward movement, bearing against the rear face of each bar; a limiting member for limiting the extent of rearward movement of each of the cam followers; force applying means for yieldably urging the cam followers forwardly of the limiting members and thus urging the bars forwardly about said axes; a stop so positioned as to limit the extent of forward movement of the yoke under the influence of said force applying means; wiping means located below the yoke and mounted for movement between a retracted position and an advanced position in a wiping stroke to wipe the margin of said end of the upper against the insole; means for initially maintaining each bar in an outer position with the cam followers outward of the cams; means for initially positioning the support so that said end of the shoe assembly is below the yoke with the inner periphery of the yoke overlapping the outer periphery of said end of the shoe assembly; means for initially maintaining the wiping means in its retracted position; means for thereafter imparting relative rising movement of the support with respect to the yoke and the wiping means to thereby cause the yoke to engage the upper and conform it to the shape of the last with the links swinging forwardly about said outer pivotal connections; means for thereafter driving the bars inwardly to cause the cams to engage the cam followers and force the cam followers rearwardly against the limiting members and to cause the links to swing further forwardly about said outer pivotal connections to thereby effect a clamping pressure of the yoke against the shoe assembly; and means for thereafter imparting a wiping stroke to the wiping means.

26. The machine as defined in claim 25 further comprising: a piston, connected to the yoke bight, mounted for forward-rearward movement; and wherein said stop comprises: a spacer in alignment with and located forwardly of the piston.

27. The machine as defined in claim 25 further comprising: second force applying means actuable to overcome said first mentioned force applying means and thereby move the bars about said axes so as to move the yoke rearwardly and preclude engagement of the yoke and the upper during said relative rising movement; optionally operable means for actuating said second force applying means during said relative rising movement; and means, effective subsequent to the completion of said relative rising movement and prior to the driving of the bars inwardly, to deactuate the second force applying means.

28. The machine as defined in claim 26 further comprising: second force applying means actuable to move the piston rearwardly away from the spacer and overcome said first mentioned force applying means and thereby move the bars, together with the yoke, rearwardly so as to preclude engagement of the yoke and upper during said relative heightwise movement; optionally operable means for actuating said second force applying means during said relative rising movement; and means, effective subsequent to the completion of said relative rising movement and prior to the driving of the bars inwardly, to deactuate the second force applying means.

References Cited

UNITED STATES PATENTS

| | | | |
|---|---|---|---|
| 3,138,810 | 6/1964 | Becker | 12—14.4 X |
| 3,325,841 | 6/1967 | Leonhardt | 12—14.4 X |
| 3,332,096 | 7/1967 | Kamborian et al. | 12—14.4 X |

PATRICK D. LAWSON, Primary Examiner